United States Patent
Schwartz et al.

(10) Patent No.: US 11,640,596 B2
(45) Date of Patent: May 2, 2023

(54) TERMINAL AND METHOD FOR MOBILE PAYMENT WITH TRUSTED EXECUTION ENVIRONMENT

(71) Applicant: GIESECKE+DEVRIENT MOBILE SECURITY GMBH, Munich (DE)

(72) Inventors: Udo Schwartz, Munich (DE); Kurt Stadler, Oberhaching (DE); Mihai Creanga, Haar (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 895 days.

(21) Appl. No.: 15/578,085

(22) PCT Filed: May 25, 2016

(86) PCT No.: PCT/EP2016/000871
§ 371 (c)(1),
(2) Date: Nov. 29, 2017

(87) PCT Pub. No.: WO2016/192842
PCT Pub. Date: Dec. 8, 2016

(65) Prior Publication Data
US 2018/0150826 A1    May 31, 2018

(30) Foreign Application Priority Data
May 29, 2015    (DE) ............... 10 2015 006 907.1

(51) Int. Cl.
*G06Q 20/40*    (2012.01)
*G06Q 20/32*    (2012.01)
(Continued)

(52) U.S. Cl.
CPC ....... *G06Q 20/3226* (2013.01); *G06Q 20/023* (2013.01); *G06Q 20/326* (2020.05);
(Continued)

(58) Field of Classification Search
CPC ...... G06Q 20/32; G06Q 20/38; G06Q 20/326; G06Q 20/023; G06Q 20/351
(Continued)

(56) References Cited

U.S. PATENT DOCUMENTS

| 2012/0116925 A1* | 5/2012 | Jamkhedkar ....... G06Q 20/3223 726/30 |
| 2014/0108263 A1* | 4/2014 | Ortiz ................. G06Q 20/3223 705/71 |

(Continued)

FOREIGN PATENT DOCUMENTS

| AU | 2014306440 A1 * | 3/2016 | ........... G06Q 20/326 |

OTHER PUBLICATIONS

"A Smart Card Alliance Mobile & NFC Council White Paper Host Card Emulation (HCE) 101," White Paper Smart Card Alliance Mobile & NFC Council, 2014, 32 Pages.
(Continued)

*Primary Examiner* — Hani M Kazimi
(74) *Attorney, Agent, or Firm* — Workman Nydegger (57) ABSTRACT

A mobile terminal is adapted for mobile payment through payment in accordance with transaction data from the customer to a merchant via a payment service provider, and is adapted for a clearing of the payment between bank servers. The terminal is characterized in that a) in the secure runtime environment access data are stored for an authentication between the payment trust application and the payment service provider; and b) the agent is further adapted b1) upon an authentication between the payment trust application and the payment service provider, to transmit access data, or authentication data generated employing access data, between the secure runtime environment and the payment service provider, and b2) to accept from the payment trust application a transaction instruction for a payment in accor-
(Continued)

dance with the transaction data and to send it to the payment service provider. A corresponding mobile payment method for a terminal is likewise specified.

11 Claims, 10 Drawing Sheets

(51) Int. Cl.
    *G06Q 20/34*     (2012.01)
    *G06Q 20/02*     (2012.01)

(52) U.S. Cl.
    CPC ..... *G06Q 20/3223* (2013.01); *G06Q 20/3229* (2013.01); *G06Q 20/351* (2013.01); *G06Q 20/352* (2013.01); *G06Q 20/40975* (2013.01)

(58) Field of Classification Search
    USPC .................................................... 705/39–45
    See application file for complete search history.

(56) References Cited

U.S. PATENT DOCUMENTS

| | | | |
|---|---|---|---|
| 2015/0019443 A1* | 1/2015 | Sheets | G06Q 20/322 705/71 |
| 2015/0052064 A1* | 2/2015 | Karpenko | G06Q 20/3227 705/71 |
| 2015/0254639 A1* | 9/2015 | Radu | G06Q 20/3674 705/41 |
| 2016/0253651 A1* | 9/2016 | Park | G06Q 20/34 705/39 |
| 2016/0253652 A1* | 9/2016 | Je | G06Q 20/02 705/39 |
| 2016/0253670 A1* | 9/2016 | Kim | G06Q 20/4012 705/72 |
| 2022/0092595 A1* | 3/2022 | Jamkhedkar | G06Q 20/3674 |

OTHER PUBLICATIONS

"GlobalPlatform Device Technology Tee System Architecture Version 1.0," Global Platform Inc, Dec. 2011, 24 Pages.
"GlobalPlatform Device Technology Trusted User Interface API Version 1.0," Global Platform Inc, Jun. 2013, 48 Pages.
"Authentication," Wikipedia, https://en.wikipedia.org/w/index/.php?title=Authentication&oldid=662289918, Retrieved from the Internet on Jul. 13, 2016, 9 Pages.
"Host-Based Card Emulation," Android Developers, https://web.archive.org/web/20150512180542/http://developer.android.com/guide/topics/connectivity/nfc/hce.html, Retrieved from the Internet on Jul. 7, 2016, 9 Pages.
"Digital Signature," Wikipedia, https://en.wikipedia.org/w/index.php?title=Digital_signature&oldid=664241568, Retrieved from the Internet on Jul. 13, 2016, 10 Pages.
"Trusted Execution Environment," Wikipedia, https://de.wikipedia.org/w/index.php? title=Trusted_Execution_Environment&oldid=126518412, Retrieved from the Internet on Feb. 5, 2016, 7 Pages.
International Search Report from PCT Application No. PCT/EP2016/000871, dated Jul. 21, 2016.
German Search Report from DE Application No. DE 102015006907.1, dated Feb. 9, 2016.
International Preliminary Report on Patentability from PCT Application No. PCT/EP2016/000871, dated Dec. 5, 2017.

* cited by examiner

State of the art

TERMINAL AND METHOD FOR MOBILE PAYMENT WITH TRUSTED EXECUTION ENVIRONMENT

FIELD OF THE INVENTION

The invention relates to a mobile terminal and a method for mobile payment by means of a mobile terminal of a customer to a merchant.

STATE OF THE ART

Known mobile electronic payment systems comprise an NFC-enabled (near field communication) mobile terminal (e.g. a mobile telephone, smart phone or similar device) of a customer or potential buyer—briefly NFC terminal—, an external payment terminal, a payment service provider and bank servers of the customer and the merchant. The bank servers include a customer bank server on which a customer's account is kept, and a merchant bank server on which an account of the merchant is kept. The terminal includes a payment application (or several) and an NFC controller with antenna. Payment applications in the terminal can for example have the form of virtual electronic payment cards (e-cards) or electronic purses (e-wallets). The NFC controller makes possible an NFC connection between the terminal and the external payment terminal (e.g. POS=point of sale).

In this application the term of the customer is understood as a payer of a payment and the term of the merchant as a payee of the payment in the broadest sense. Aspects such as in what role and form the customer and merchant are acting, for example for private or commercial purposes, are irrelevant in contrast.

In an overall overview, a mobile payment from the terminal of a customer to the merchant includes the following steps. The merchant creates a payment request from transaction data T (including at least the payee (merchant, vendor . . . ) and the amount) and sends it to the payment terminal. The customer holds his terminal to the payment terminal. The payment terminal subsequently sends the transaction data T via the NFC interface to the terminal to output a payment request to the terminal. In the terminal the transaction data T received via NFC are directed to the payment application (possibly after selecting one of several payment applications). The payment application presents the transaction data to the customer and authenticates the customer. Successful authentication is interpreted as authorization or confirmation (by the customer) of the transaction data. Following the authorization/confirmation, the payment application sends a transaction instruction corresponding to the transaction data to the payment terminal. The payment terminal, making reference to the transaction instruction, in turn tasks the payment service provider authorized vis-à-vis the bank servers with the clearing of the payment at the bank servers. The bank servers of the customer and the merchant finally carry out the clearing of the payment, i.e. cause money according to the payment to be transferred from the customer's account to the merchant's account.

Known mobile payments are protected against manipulation by authentication. In order to make the authentication possible, the payment application is implemented in a security element provided in the terminal. In addition to the actual application, the payment application includes authentication data associated with the payment application (e.g. cryptographic keys) and possibly further personalization data or customer data (e.g. (credit) card numbers or bank account data).

Technically, the authentication can be effected by means of a signature, for example. Here, a signature over transaction data is generated in the terminal by means of access data (here in particular by means of a private key of an asymmetric public-private pair of keys) and a transaction instruction is generated from the signed transaction data (i.e. the signature) and further data (e.g. the transaction data in plain text). The transaction instruction is sent from the terminal via the NFC interface to the payment terminal. In the payment terminal the transaction instruction/signature is verified (in particular with the corresponding public key to the private key).

Alternatively, the authentication is effected by establishing a secure channel (i.e. a channel that is cryptographically secured through authentication and key derivation) between the terminal and the payment terminal by means of access data (e.g. cryptographic key), and the transaction instruction is sent via the secure channel from the terminal to the payment terminal.

The authentication is realized via an end-to-end cryptographically secured connection between a terminal-side, secure endpoint at the payment terminal and a payment-application-side, secure endpoint in the security element of the terminal.

As a security element, for example, a Secure Element can be employed, i.e. the authentication element for authentication of the terminal in the mobile communication network. As Secure Element, for example a UICC (universal integrated circuit card), a SIM card (SIM=subscriber identity module) or an eUICC (embedded UICC) is provided. The payment applications are designed as payment applets in the Secure Element.

In managing the Secure Element a variety of different bodies are involved. This makes the management of the Secure Element complex.

Even minimal changes in the Secure Element can possibly require cooperation among several partners and thus the entire complex infrastructure of management. Accordingly, the management effort is not scaled here in line with the scope of changes. Similarly, depending on the nature of a management measure, a different dimension of security is required. In the management of the Secure Element the security level is not scalable either, but the same security infrastructure with the same security level is always employed.

Since version 2.3.3 "Gingerbread", the Android operating system for mobile terminals has made programming interfaces available for the secure use of NFC technology. This makes it possible to use NFC in the operating modes "Reader/Writer" and "peer-to-peer" in software-only solutions (without a Secure Element SE in hardware form). With the Android version 4.4 "KitKat", in addition the system of host-based card emulation (HCE) has been implemented, making available the NFC operating mode "card emulation mode" for a secure NFC solution realized purely in software form. HCE is an image of an NFC smart card realized purely in software form that is implemented on the terminal, thus of an NFC-enabled security element equipped with an NFC antenna.

For mobile terminals bipartite runtime architectures are known, including a secure runtime environment producible by a secure operating system, also referred to as trusted execution environment TEE, and a normal runtime environment producible by a normal operating system (e.g. Android), also referred to as rich execution environment REE. Such architectures are addressed for example in a number of documents of the Global Platform Organization.

In a mobile terminal with secure runtime environment payment applications are typically likewise divided into two, namely into a payment rich application that is implemented in the normal runtime environment, and a payment trust application that is implemented in the secure runtime environment The payment trust application carries out security-critical partial tasks within the framework of a transaction, such as encryption/decryption, authentication, signature formation, and the like.

SUMMARY OF THE INVENTION

The invention has the object of providing a secure, scalable mobile payment system and method with a reduced management effort. In particular, the effort and the level of security are to be scalable and the complexity is to be reduced, in particular by reducing the number of entities involved.

The mobile terminal according to claim 1 is at the disposal of a customer who wishes to use it to effect mobile payment to a merchant (seller). The terminal is adapted for mobile payment through a payment by the customer to the merchant via a payment service provider, which in turn is adapted to initiate a clearing of the payment between bank servers of the customer and the merchant, in accordance with transaction data that are generated by the merchant. The mobile terminal includes a normal runtime environment and a secure runtime environment. It includes further an agent that is adapted to accept transaction data from a payment terminal, an authorization interface implemented in the terminal that is adapted to present transaction data received at the agent to the customer for authorization and to accept and forward an authorization input by the customer at the authorization interface, as well as a payment application implemented in the terminal, at least one secure portion of which, namely a payment trust application, is implemented in the secure runtime environment, and which is adapted to accept an authorization forwarded by the authorization interface and, in response to the accepted authorization, to generate and send a transaction instruction.

The terminal is characterized in that:
a) in the secure runtime environment access data for an authentication between the payment trust application (trustlet) and the payment service provider are stored; and
b) the agent is adapted to
b1) upon an authentication between the payment trust application and the payment service provider, to transfer between the secure runtime environment and the payment service provider either the actual access data (or at least some of the access data), or alternatively authentication data generated employing the access data (or at least some of the access data), and
b2) to accept from the payment trust application a transaction instruction for a payment in accordance with the transaction data and to send it to the payment service provider.

In the state of the art, the sending of a transaction instruction from the terminal to the payment terminal always means that the transaction instruction leaves the secure runtime environment. Consequently, the transaction instruction must be protected cryptographically, for example encrypted in a cryptogram. In contrast, the agent according to the invention, in connection with the access data stored in the secure runtime environment, makes it possible for the payment trust application implemented in the secure runtime environment to request the payment service provider with a transaction instruction to effect clearing directly from the secure runtime environment. Here, the agent mediates the setup and operation of a single secure transmission path from the payment trust application in the secure runtime environment up to the payment service provider. The payment terminal can even be omitted entirely in the sending of the transaction instruction from the terminal to the payment service provider. Alternatively, the payment terminal merely passes on the transaction instruction. In any case, the interruption of the secure transmission path is omitted, which occurs at the payment terminal in the state of the art. Although the solution does not include a Secure Element, yet a sufficiently high level of security is achieved. The secure runtime environment in which the access data are stored is managed by one single entity. In contrast to a solution with a Secure Element, the access data can therefore be processed comparatively easily in the secure runtime environment. Coordination with other entities, as required in a Secure Element solution, is not required. The only entity can, if necessary, even define a certain level of security autonomously, depending on determined security requirements, thus can scale the security level.

Therefore, according to claim 1, a secure, scalable mobile payment system and method with a reduced management effort is provided.

The authorization interface is configured to accept authentication data of the customer, such as for example a PIN, a password or a biometric datum, such as a fingerprint etc. Inputting authentication data at the authorization interface effectuates an (active) authentication of the customer vis-à-vis the terminal, and at the same time a confirmation of the transaction by the customer. The authorization interface is configured in accordance with the type of request to be output to the customer and the authentication data to be input, for example as a display (for input), keyboard (for input), touch display (for output and input), fingerprint sensor (for inputting biometric fingerprint data), etc.

According to a first embodiment variant, the agent is configured as a software emulation of a smart card, in particular an Android host-based card emulation HCE. In this embodiment variant, the agent is preferably implemented in the normal execution environment. The emulation or the HCE is able to communicate to the outside, from the terminal, on the one hand. To the outside, the agent is able more exactly to firstly communicate with a payment terminal via the terminal's own NFC controller, and to secondly communicate with a payment service provider via a (mobile) network. On the other hand, the emulation or the HCE is able to communicate with the trust applications in the secure runtime environment within the terminal. Two embodiment examples of this first, card emulation variant are described below with reference to FIG. 3 and FIG. 5.

According to a second embodiment variant, the agent is configured as a trust application implemented in the secure runtime environment. The agent can be configured as a separate agent trust application mediating between the payment trust application and the payment service provider. Alternatively, the payment trust application itself is provided as agent trust application. The payment trust application itself can thus access the access information in order to perform the authentication vis-à-vis the payment service provider. Two embodiment examples of this second, trust application variant are described below with reference to FIG. 7 and FIG. 9.

The access data according to a first embodiment variant of the authentication include at least one channel key for setting up and operating a secure channel between the secure runtime environment and the payment service provider. Here, the agent is adapted according to b1) to establish the secure channel employing the channel key, and according to b2) to send the transaction instruction via the secure channel to the payment service provider.

According to a second embodiment variant of the authentication, the access data include a signature generation key for generating a signature. Here, the transaction instruction can be generated by the payment trust application signing the transaction data (and possibly further data) by means of the signature generation key. Preferably, by the signing more exactly one signature is generated over the transaction data, and the signature and further data, in particular the transaction data, are combined to form the transaction instruction, so that the transaction instruction is generated. At the payment service provider the corresponding signature verification key is stored. The agent is adapted according to b1) and b2) to send a transaction instruction generated by signing the transaction data with the signature generation key to the payment service provider, so that the transaction data are verifiable for the payment service provider on the basis of the verification of the signature.

A mobile payment method according to the invention for a terminal of a customer according to claim 7 is adapted for mobile payment by payment from the customer to a merchant via a payment service provider PSP, in accordance with transaction data generated by the merchant M. The mobile terminal includes a normal runtime environment and a secure runtime environment. The terminal further includes an agent implemented in the terminal; an authorization interface implemented in the terminal; and a payment application implemented in the terminal, at least one secure portion of which, namely a payment trust application, is implemented in the secure runtime environment.

In the method the steps are provided that:
transaction data from a payment terminal are accepted by the agent;
transaction data received by the authorization interface on the agent are presented to the customer for authorization, and an authorization input by the customer at the authorization interface is accepted and forwarded;
an authorization forwarded by the payment trust application is accepted by the authorization interface, and, in response to the accepted authorization, a transaction instruction is generated and sent.

The method is characterized in that
a) an authentication is carried out between the payment trust application and the payment service provider, employing access data stored in the secure runtime environment; and
b) by the agent:
b1) upon the authentication between the payment trust application and the payment service provider (some or all of) the actual access data (e.g. channel keys, see below) or authentication data (e.g. signature over transaction data or transaction instruction including such a signature, see below) generated employing (some or all of) the access data are transferred between the secure runtime environment and the payment service provider; and
b2) the transaction instruction sent by the payment trust application is accepted and sent to the payment service provider.

With the support of the agent, the payment trust application is able to transfer the transaction instruction to the payment service provider in secured manner, in order to trigger a request for the clearing of the payment by the payment service provider. The agent thus acts as an intermediary in the authentication between the payment trust application and the payment service provider. The forwarding of the transaction instruction from the payment service provider to the clearing in the bank servers is effected for example in a known manner.

According to a first embodiment variant of the authentication, the agent according to feature b1) establishes a secure channel employing access data in the form of a channel key, and in step b2) sends the transaction instruction via the secure channel to the payment service provider.

Figure 5:
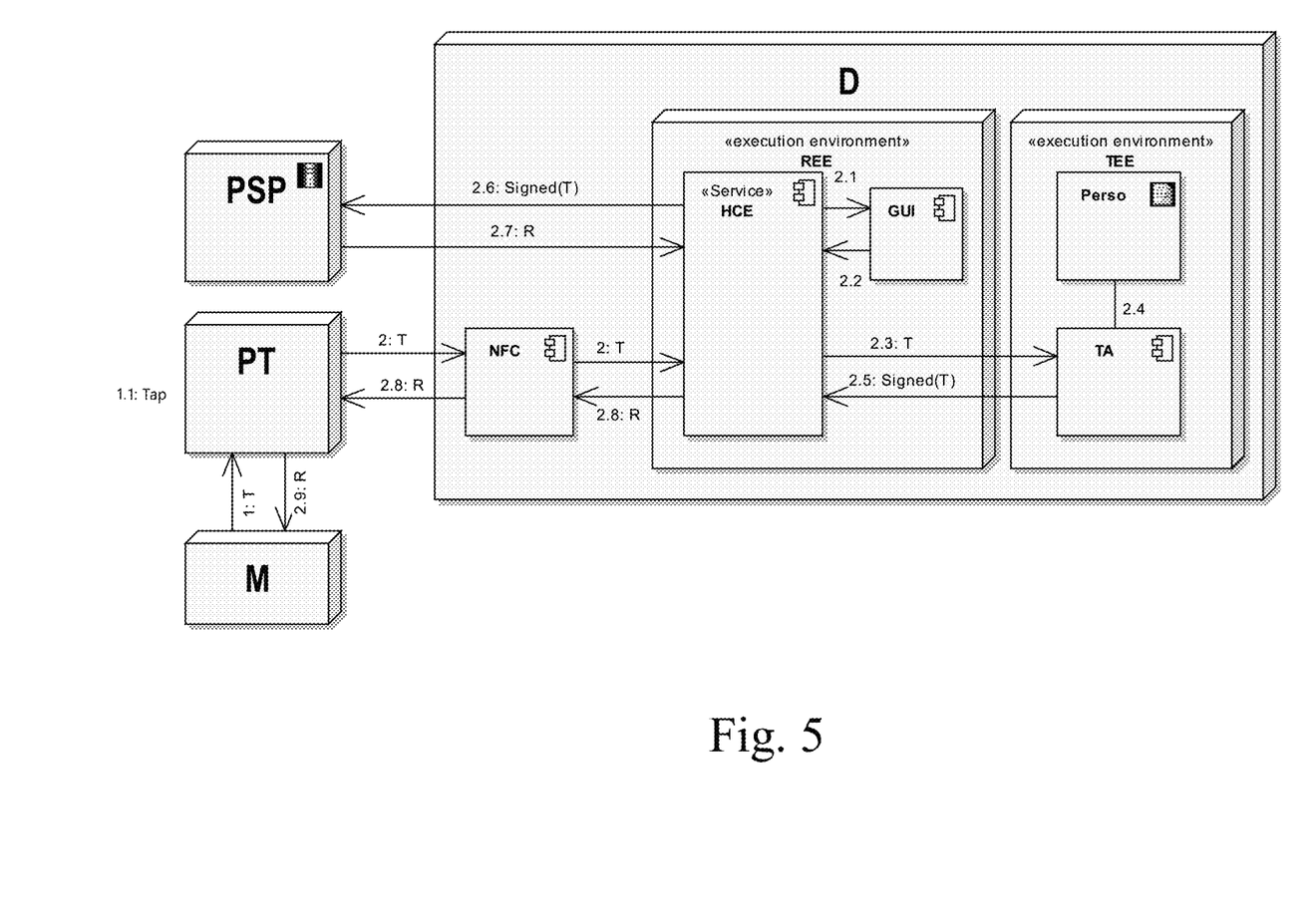
FIG. 5 a system for mobile payment in a structural representation, according to a second embodiment of the invention.
Figure 7:
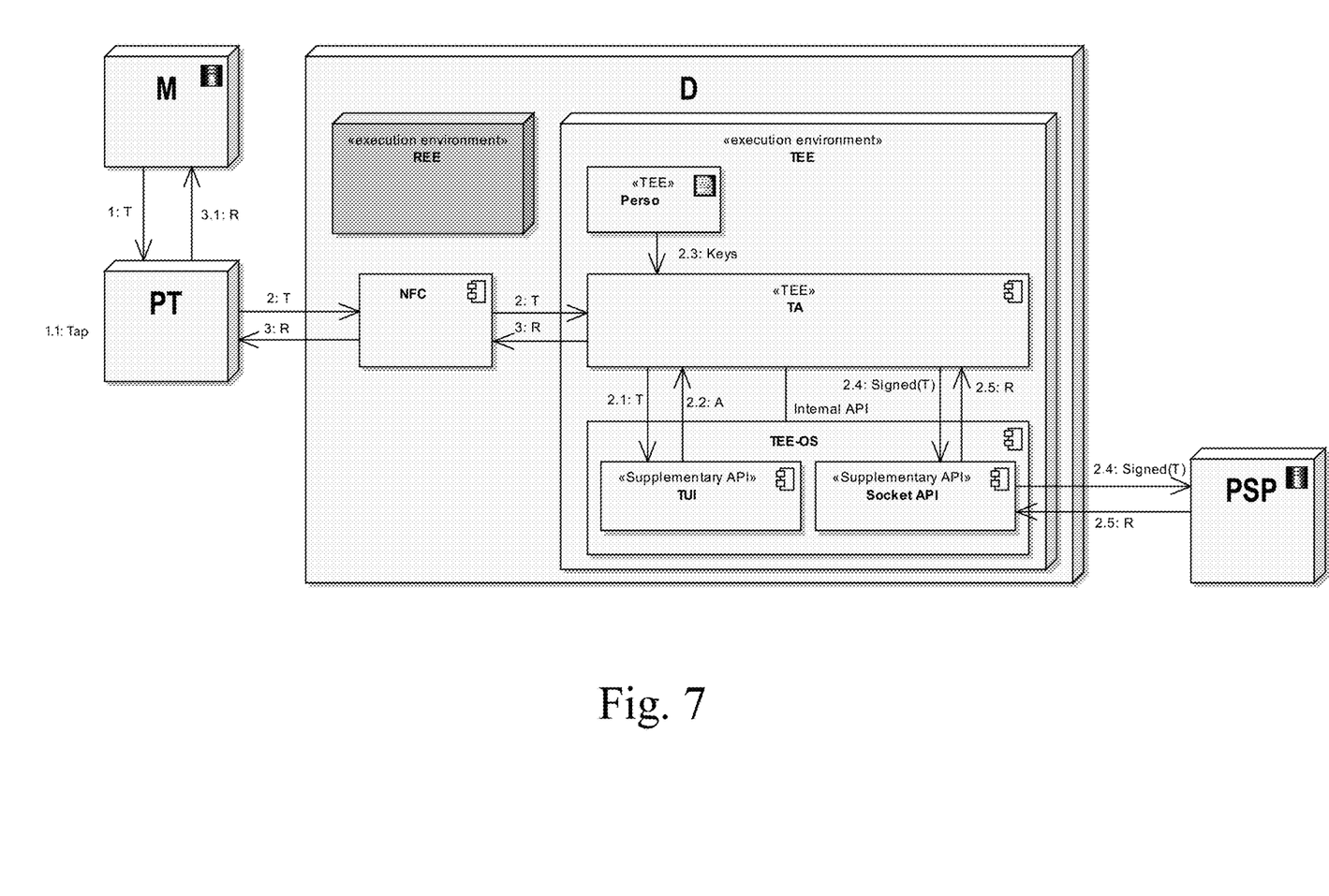
FIG. 7 a system for mobile payment in a structural representation, according to a third embodiment of the invention.

According to a first aspect of the first embodiment variant of the authentication, the agent according to feature b1) sets up the secure channel directly to the payment service provider. In the figure description, an example of the first type is shown in FIG. 5, with an agent in the form of a HCE. An example of the first type with an agent in the form of a trust application that establishes a connection to the payment service provider via a TEE socket API is shown in FIG. 7.

Figure 3:
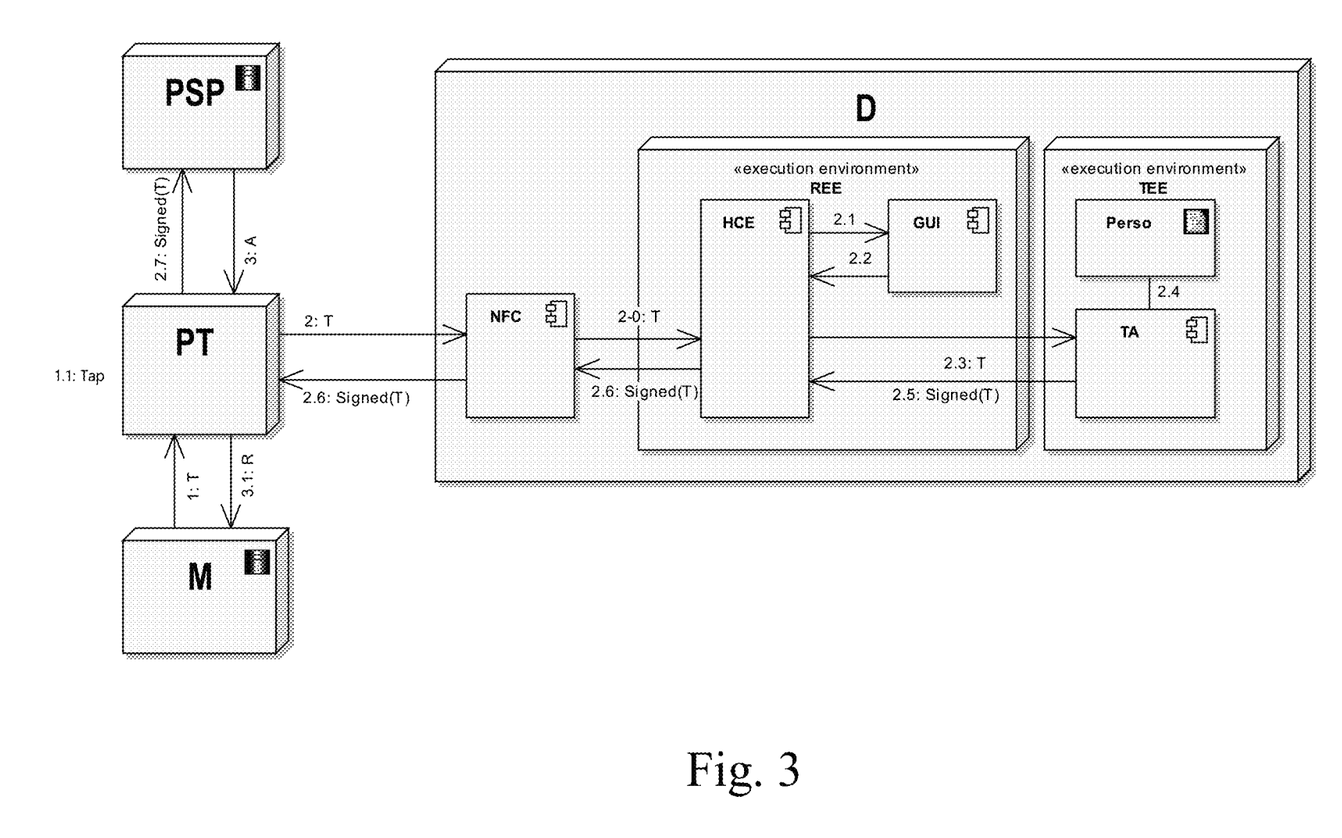
FIG. 3 a system for mobile payment in a structural representation, according to a first embodiment of the invention.
Figure 9:
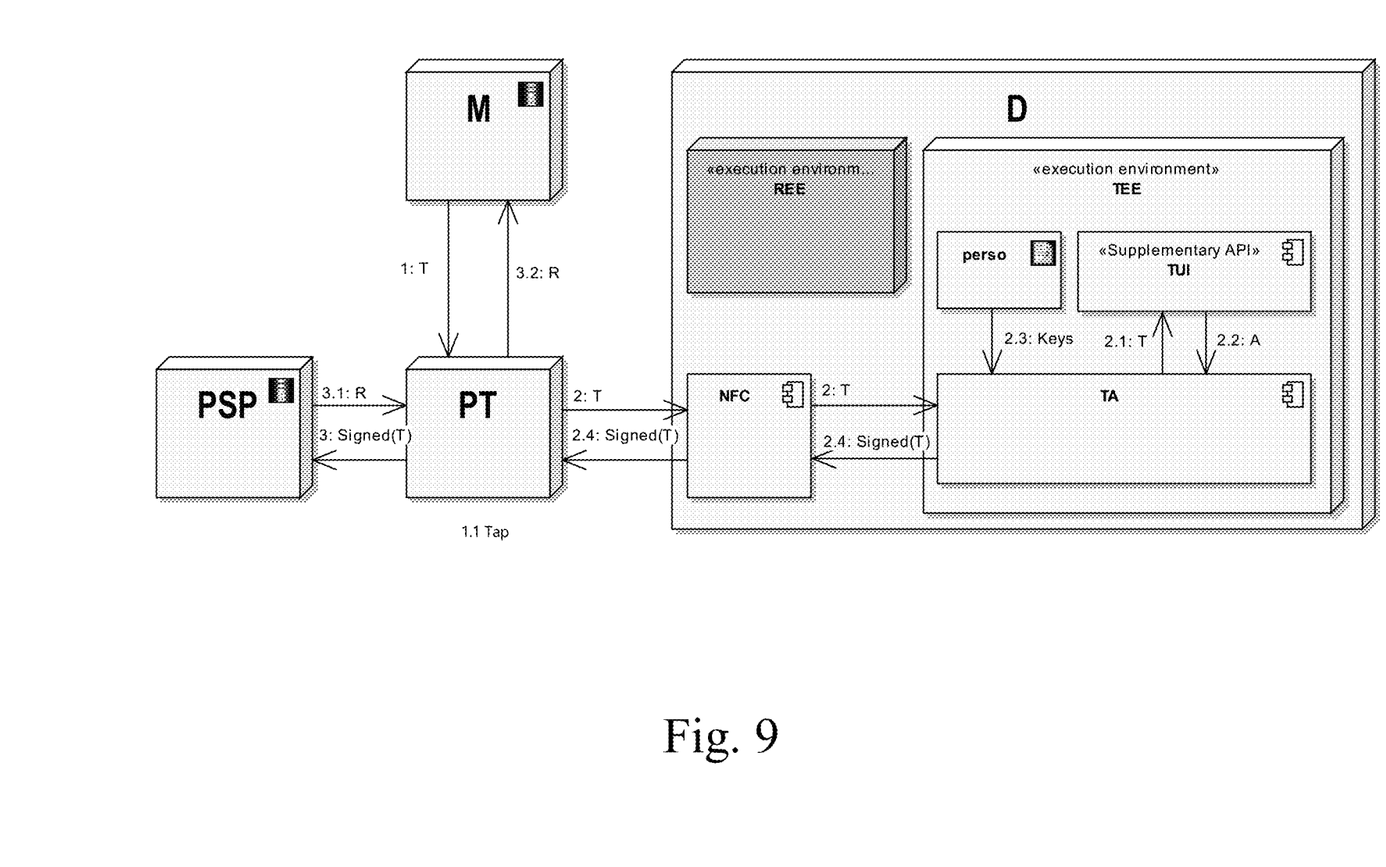
FIG. 9 a system for mobile payment in a structural representation, according to a fourth embodiment of the invention.

According to a second type of the first embodiment variant of the authentication, the agent according to feature b1) establishes the secure channel to the payment service provider via an NFC payment terminal, which itself does not have the access data (e.g. channel key, signature key), and in particular merely passes the transaction instruction on. In the figure description, an example of the second type is shown in FIG. 3, with an agent in the form of an HCE. An example of the second type with an agent in the form of a trust application is shown in FIG. 9.

To obtain the authorization of the transaction from the customer, it can be provided where required that the agent tasks an input/output application that outputs to the customer or accepts inputs from the customer at an authorization interface of the terminal.

Optionally, the request to the customer and the authorization by the customer are output and/or accepted via a secure authorization interface (input, output, input/output interface) implemented in the secure runtime environment. It can be provided here in particular that a trusted application implemented in the secure runtime environment is tasked by the agent with controlling the user interface. Optionally, authorization interfaces can be used for authenticating the customer which are called up directly from the secure runtime environment.

BRIEF DESCRIPTION OF THE DRAWINGS

In the following the invention will be explained in more detail on the basis of embodiment examples and with reference to the drawings, in which there are shown.

DETAILED DESCRIPTION OF EMBODIMENT EXAMPLES

Figure 1:
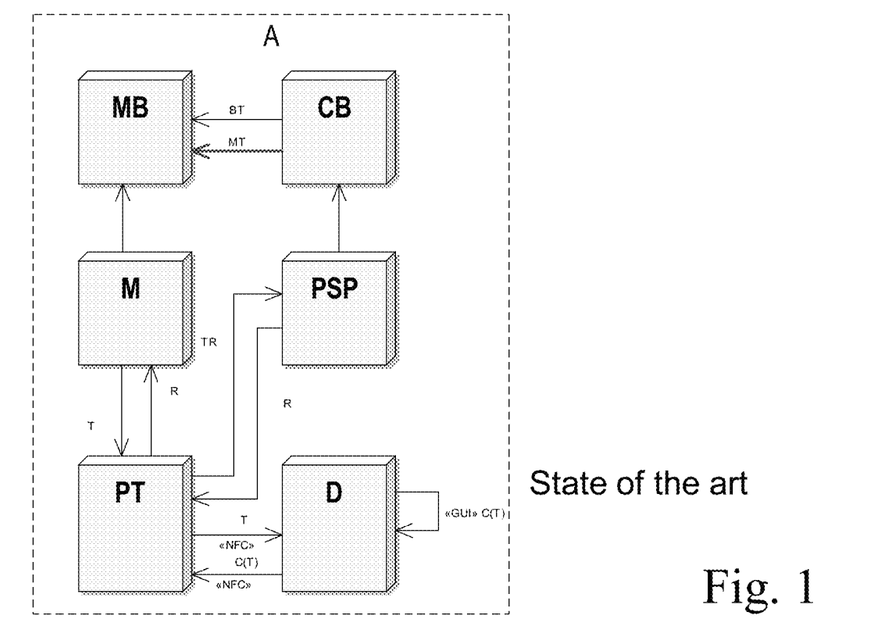
FIG. 1 a system for mobile payment in the overview, according to the prior art.

FIG. 1 shows a system for mobile payment according to the state of the art. The system includes a merchant server M of a merchant, a mobile terminal D ("device") employed by a customer, an NFC payment terminal PT, a payment-service-provider server (or payment processing server) PSP, a customer bank server CB and a merchant bank server MB. The system in the narrower sense is constituted by the mobile terminal D, the NFC payment terminal PT and the payment-service-provider server PSP. The merchant server M and the bank servers CB, MB complete the system.

The communication channel between the terminal D and the payment-service-provider server PSP comprises two sections, namely a first section between the mobile terminal D and the NFC payment terminal PT, and a second section between the NFC payment terminal PT and the payment-service-provider server PSP. In order to secure the communication channel through authentication, the two sections must be secured separately by authentication in each case. To this end, first access data are agreed between the mobile terminal D and the NFC payment terminal PT, and second access data that are different from and independent of the first access data are agreed between the NFC payment terminal PT and the payment-service-provider server PSP. The authentication by means of the access data can be configured either as the setup and operation of a secure channel between the respective communication partners, or as a generation of a signature by a communication partner and verification of the signature by the other communication partner.

In case of a payment according to the state of the art in a system according to FIG. 1, the merchant server M sends transaction data (or transaction information) T to the NFC payment terminal PT in order to initiate the payment.

The core part of the conventional method according to FIG. 1 that is of particular importance for the invention starts at this point at the NFC payment terminal PT. The NFC payment terminal PT sends the transaction data T to the mobile terminal D in an NFC connection secured by authentication. The customer is requested to confirm the transaction data T by an output on his terminal D. The customer authenticates himself with an input on the terminal D and confirms the transaction data T by his input. The output to the customer is effected for example by displaying an input mask on the touch display of the terminal D. The input is effected for example by making an input in the displayed input mask on the touch display of the terminal D. The type and strength of authentication is determined by the application, the technical properties and possibilities of the terminal D, as well as specifications ("policies") of the payment service provider PSP and is not relevant to the method. Following the inputs of the user, the terminal D generates a transaction instruction TR, signs the same with first access data and sends the signed transaction instruction TR to the NFC payment terminal PT via the first section. The NFC payment terminal verifies the signature, newly signs itself the transaction instruction TR with second access data and sends the transaction instruction TR to the payment-service-provider server PSP via the second section. The terminal D does not have the second access data here. The payment-service-provider server PSP does not have the first access data. By the steps taken in the core part of the method, the transaction has been presented to the customer's terminal D for confirmation and has been finished for clearing in the bank background system after confirmation by the customer at the payment-service-provider server PSP.

The completion of the transaction includes that the payment-service-provider server PSP sends a payment instruction to the customer bank server CN and the customer bank server CB initiates payment in accordance with the payment instruction to the merchant bank server MB.

Figure 2:
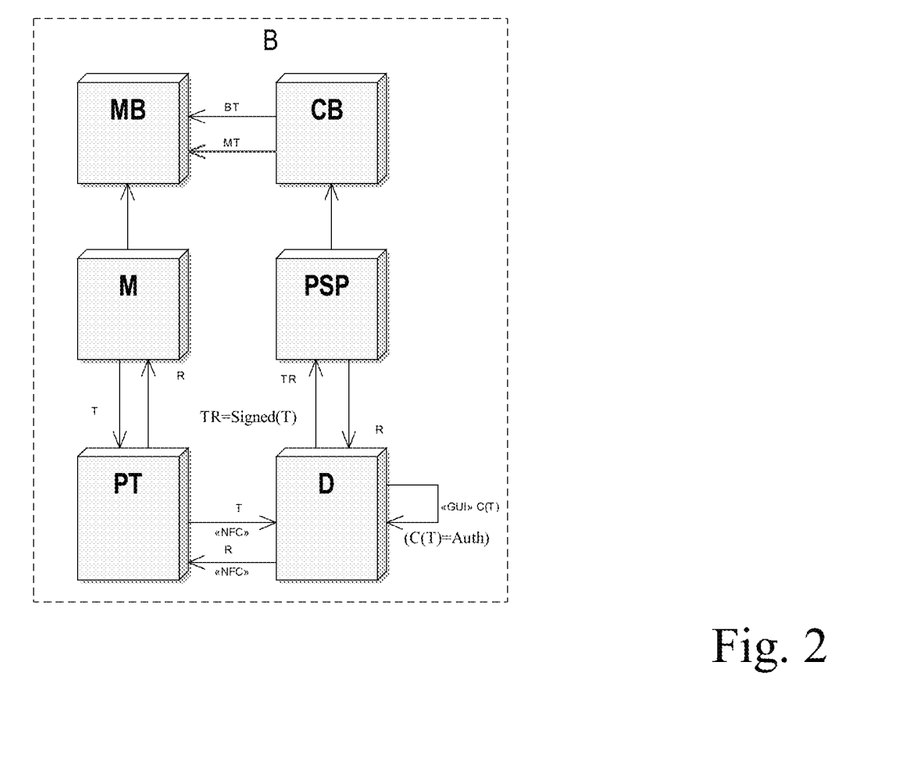
FIG. 2 a system for mobile payment in the overview, according to one embodiment of the invention.

FIG. 2 shows a system for mobile payment according to one embodiment of the invention. A payment in the system of FIG. 2 differs from a payment in the conventional system of FIG. 1 with respect to the core part. The sending of transaction data (or transaction information) T from the merchant server M to the NFC payment terminal PT effected prior to the core part and the clearing via the bank servers of the customer and the merchant effected after the core part are effected like in FIG. 1 in contrast. Likewise differing from the system of FIG. 1, in the system of FIG. 2, the mobile terminal necessarily has a secure runtime environment TEE. Further differing from the state of the art, access data have been agreed between the terminal D and the payment service provider PSP.

In the core part of a payment in the system according to FIG. 2, the NFC payment terminal PT, initially like in the conventional method, sends the transaction data T to the mobile terminal D via an NFC connection. The customer authenticates himself vis-à-vis the terminal by inputting an authorization C(T)=Auth( ) for example by inputs in displayed input masks on the touch display of the terminal D, and hereby confirms the transaction data T at the terminal D (the type and strength of authentication is determined by the technical possibilities of the terminal D and the specifications of the PSP). Following the inputs of the user, the terminal D generates a transaction instruction Signed(T) by signing the transaction data T and possibly further data with the access data and appending the transaction data in plain text. The thus generated transaction instruction Signed(T) thus now includes the transaction data T in plain text and a signature over the (or some of the) transaction data T. The stock of transaction data T can change in the course of the process, for example by adding or omitting individual elements (e.g. date-time stamp, customer, reference ID, . . . ) of transaction data T. The terminal sends the generated transaction instruction TR=Signed(T) directly to the payment-service-provider server PSP. Thus, the terminal D has the access data, unlike in FIG. 1, where it is the payment terminal PT. Consequently, that functional part of the NFC payment terminal PT which is in charge of initiating the clearing on the bank servers, has been relocated into the terminal D. Overall, thus the complete partial process prior to the confirmation of the transaction data T by the customer up to the initiation of the clearing is relocated into the closed system of the terminal D. The payment terminal PT is no longer required for the dispatch of transaction instructions TR=Signed(T), i.e. confirmed/authorized (C(T)=Auth(T)) and signed (TR=Signed(T)) transaction data T, from the terminal D for clearing, but can still be present as a pure passage station (cf. detailed embodiments described below). In embodiments with the payment terminal PT as a passage station, the communication flows at first glance flow as shown in FIG. 1. However, in contrast to FIG. 1, a continuous secure communication channel is operated from the terminal D to the payment service provider PSP, passing through the payment terminal PT.

FIGS. 3, 5, 7 and 9 show the structure of the systems for mobile payment in structural representations according to a first, second, third and fourth embodiment of the invention. In the structural representation, the terminal D is represented in structurally resolved manner.

In the systems according to FIGS. 3 and 5, an agent adapted for communication of the terminal D with a payment service provider PSP is provided in the terminal D, said agent being implemented in the normal runtime environment REE and being configured as an Android host-card emulation HCE.

In the systems according to FIGS. 7 and 9, an agent adapted for communication of the terminal D with a payment service provider PSP is provided in the terminal D, said agent being implemented in the secure runtime environment TEE as a trusted application. More exactly, the agent according to FIGS. 7 and 9 is integrated in the payment trust application TA. An NFC interface NFC of the terminal D is likewise implemented under the control of the secure runtime environment TEE in the systems according to FIGS. 7 and 9. Further, in the secure runtime environment TEE a driver is implemented for a trusted user interface (touch display of the terminal D) TUI, thus a variant of a display driver GUI that is implemented in the secure runtime environment TEE ("trusted user interface", TUI).

In the embodiments according to FIG. 3, FIG. 9, the communication between the terminal D and the payment service provider PSP is effected via a payment terminal PT (which acts only as a passage station, however). In the embodiments according to FIG. 5, FIG. 7, the agent is adapted to contact the payment service provider PSP directly.

In the figures, process steps are denoted by numerals such as 1, 1.1, 1.2, 2, 2.1, 3, etc. FIG. 3 shows a system for mobile payment in a structural representation, according to a first embodiment of the invention. The system includes a terminal D, a payment terminal PT, a payment service provider PSP and a merchant server M. The terminal D includes an NFC interface NFC, a normal runtime environment REE and a secure runtime environment TEE. The normal runtime environment REE includes an agent configured as an Android host card emulation HCE and a display driver GUI for controlling a touch display of the terminal D. The agent HCE is adapted to mediate the communication between the NFC interface NFC with entities within the normal runtime environment REE and also in the secure runtime environment TEE. The secure runtime environment TEE is controlled by a security operating system TEE-OS and includes a payment trust application TA (i.e. the secure portion of a payment application of the terminal D, whose possibly additionally present non-secure portion in the normal runtime environment REE is not represented) and personalization data Perso relating to the payment trust application TA and/or the entire payment application. The personalization data Perso include access data, which are agreed between the terminal D and the payment service provider PSP, and which are configured here as cryptographic keys for signature generation.

In the following, four communication flows are described in connection with a transaction in the system of FIG. 3 with reference to FIG. 3 and FIG. 4. 1: The merchant server M sends transaction data T to the payment terminal PT and indicates to the customer that he is now expected to pay with his NFC-enabled terminal D. 1.1: The customer holds his terminal D to the payment terminal PT within the NFC range, thereby initiating NFC communication between the terminal D and the payment terminal PT. In addition, the terminal D in step 1.1 communicates to the payment terminal PT the application identifier AID of the payment application or payment trust application to be employed. 2: The payment terminal sends the transaction data T (and the application identifier AID, not expressly represented) to an NFC interface NFC of a terminal D. The transaction data T and the AID can be packed for NFC dispatch, e.g. into an NFC tag, which is unpacked in the terminal D to extract the transaction data T and the AID. 2.0: The NFC interface sends the transaction data T (and the AID) (e.g. in an APDU command) to the agent HCE. 2.1: The agent HCE sends the transaction data T first to the display driver GUI, which requests a confirmation of the transaction data T from the customer, thus from the holder of the terminal D. Step 2.2: The display driver GUI accepts the confirmation input by the customer in the form of a customer authentication Auth( ) (e.g. PIN, password, fingerprint, etc.) and forwards it to the agent HCE. 2.3: The agent HCE sends the confirmed transaction data T and the AID to the payment trust application TA. 2.4: The payment trust application TA accesses the personalization data Perso, reads the required access data, more exactly the signature generation key, and signs the transaction data T with the signature generation key to form a signature. The payment trust application TA further combines the confirmed transaction data T and the signature to form a transaction instruction Signed(T). 2.5: The payment trust application TA sends the transaction instruction Signed (T) to the agent HCE. 2.6: The agent HCE sends the transaction instruction Signed(T) (e.g. in a APDU command) to the NFC interface, which sends the transaction instruction Signed(T) on to the payment terminal PT. 2.7: The payment terminal PT passes on the signed transaction instruction Signed(T) to the payment service provider PSP without any processing of its own. The payment service provider PSP verifies the signature of the transaction instruction Signed(T) and, in the positive case of a positive verification, initiates the clearing of the transaction via the bank servers MB, CB of the merchant and the customer. Step 3: After initiating the clearing, the payment service provider PSP sends to the payment terminal PT a so-called "approval" A (confirmation by the PSP of the effected transaction) about the effected transaction. 3.1: The payment terminal PT passes on the approval A(T) to the merchant server M for information, for example in a receipt R. 3.2: The payment terminal PT forwards the approval A, now complemented by a date and time stamp "dateTime", to the agent HCE for information.

Figure 4:
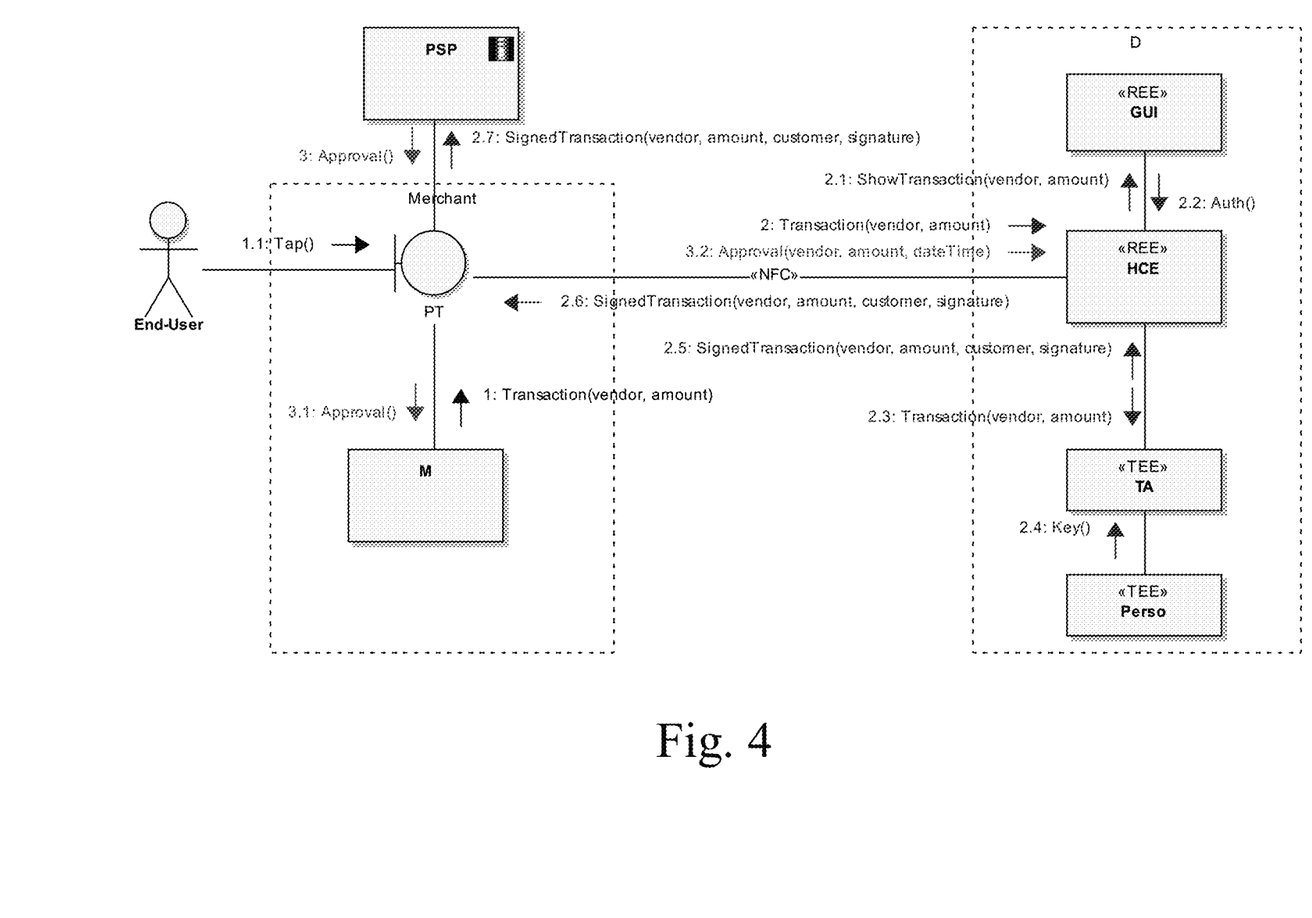
FIG. 4 a flowchart for a transaction in a system according to FIG. 3.

FIG. 4 shows a flowchart for a transaction in a system according to FIG. 3, from which the stock of transaction data T in the course of the process can be gathered in particular. In steps 1 to 2.3, the transaction data T comprise the seller "vendor" (usually this is the merchant) and the sum "amount". After reading the signature generation key (step 2.4), the transaction data T are complemented by a designation of the "customer". The transaction data T are signed with the signature generation key. The "signature" thus generated and the complemented transaction data T are combined to form a transaction instruction Signed(T), which is sent to the payment service provider PSP (step 2.6). The approval A from the payment terminal PT to the agent HCE in the terminal D includes as transaction data T the seller "vendor", the sum "amount" and a date-time stamp "dateTime".

FIG. 5 shows a system for mobile payment in a structural representation according to a second embodiment of the invention. A multiplicity of elements is configured like in the first embodiment according to FIG. 3, 4 and is not described further at this point. Unlike the system of FIG. 3, in the system of FIG. 5 the agent HCE has additional functionalities in comparison to the agent HCE of FIG. 3, to the effect that it can contact the payment service provider PSP directly.

In the following, six communication flows are described in connection with a transaction in the system of FIG. 5 with reference to FIG. 5 and FIG. 6. The method starts initially like in the first embodiment example, with the steps 1 to 2.5 of FIG. 3. The system is in the status that the agent HCE has transaction data T confirmed by the customer and signed by the payment trust application TA with access data (signature generation key), and a transaction instruction Signed(T) has been generated thereby. Unlike the first embodiment, in a step 2.6 now the agent HCE sends the transaction instruction Signed(T) immediately to the payment service provider PSP. The payment service provider PSP verifies the signature in the transaction instruction Signed(T) with the signature verification key and, in the positive case of positive verification, initiates the clearing of the transaction via the bank servers MB, CB of the merchant and the customer. 2.7: After initiating the clearing, the payment service provider PSP sends an acknowledgement, a so-called "receipt" R to the agent HCE of the terminal D. The agent HCE packs the receipt R into an APDU command and, step 2.8, forwards it to the NFC interface NFC, which unpacks the APDU command, extracts the receipt R and forwards the receipt R to the payment terminal PT. 2.9: The payment terminal PT sends the receipt R to the merchant server M for information.

Figure 6:
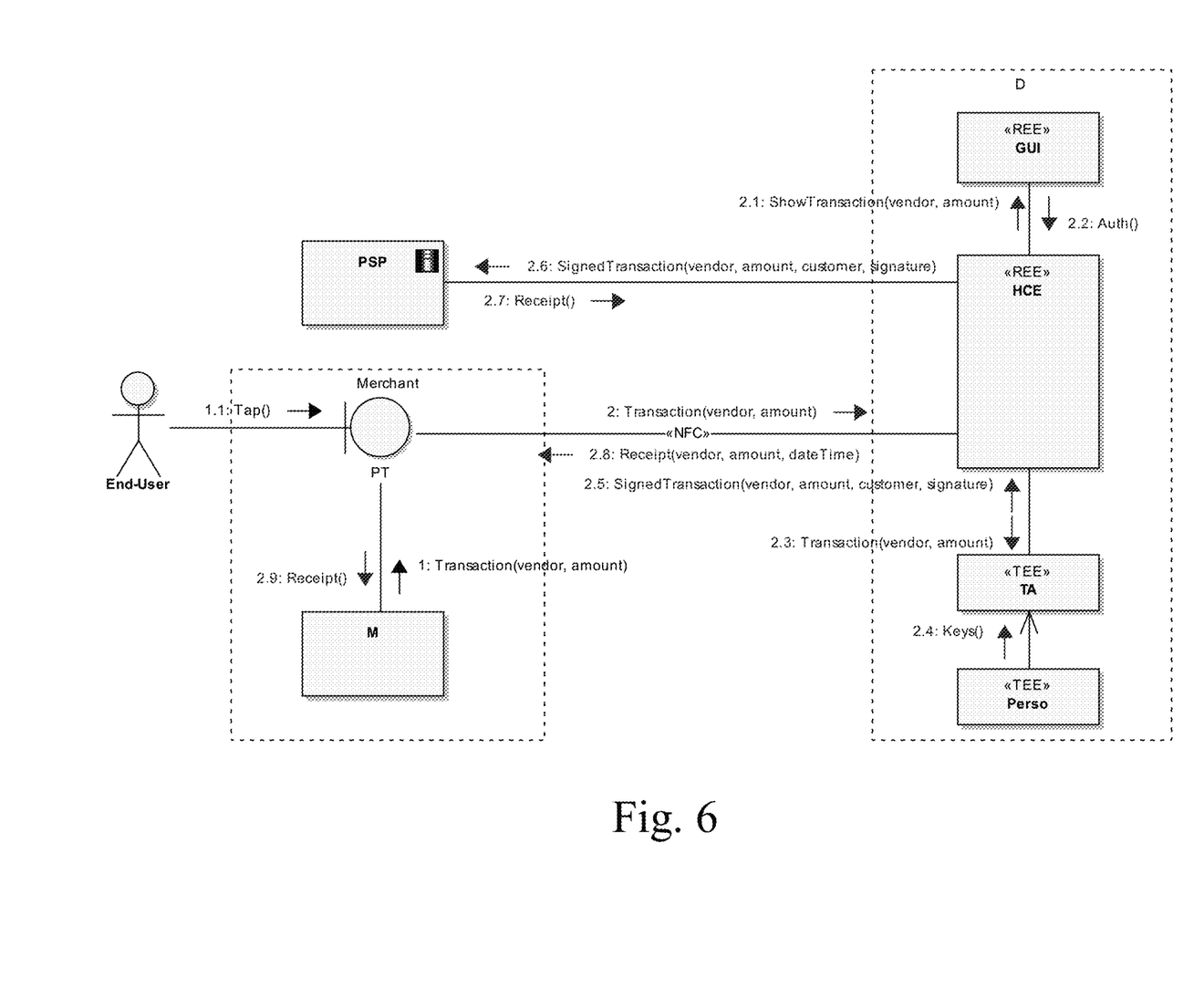
FIG. 6 a flowchart for a transaction in a system according to FIG. 5.

FIG. 6 shows, analogously to FIG. 4, a flowchart of a transaction in a system according to FIG. 5, from which the stock of transaction data T in the course of the process can be gathered in particular. In steps 1 to 2.3, the transaction data include the seller "vendor" and the sum "amount". After reading the signature generation key (step 2.4), the transaction data T are complemented by the "customer" and signed. The "signature" is appended to the transaction data T. The transaction instruction Signed(T) is generated thereby. Said transaction instruction is finally sent to the payment service provider PSP (step 2.6). The receipt R sent in step 2.8 by the agent HCE of the terminal D to the payment terminal PT includes the transaction data T of seller "vendor", the sum "amount" and the date and time stamp "dateTime".

FIG. 7 shows a system for mobile payment in a structural representation according to a third embodiment of the invention, wherein the agent in the secure runtime environment TEE is integrated in the payment trust application TA. First, like in the first and second embodiment according to FIG. 3, FIG. 5, in Step 1: transaction data T are sent from a merchant server M to a payment terminal PT and in step 2: the transaction data T and an AID of the payment trust application TA are sent to an NFC interface NFC of the terminal D. The NFC interface NFC is under the control of a security operating system TEE-OS, by which the secure runtime environment TEE is controlled. By the reception process 2 at the NFC interface NFC the transaction data T are immediately transferred into the secure runtime environment TEE. Still under the control of the security operating system TEE-OS (still step 2), the transaction data T and the AID are directed through the NFC interface to the payment trust application TA. 2.1: The payment trust application TA initiates via a secure user interface driver TUI implemented in the secure runtime environment TEE that the customer is authenticated in an appropriate manner vis-à-vis the terminal D, in order to confirm the transaction. 2.2. The user interface driver TUI accepts a confirmation/authentication A (Auth) input by the customer and forwards the confirmation/authentication A to the payment trust application TA. 2.3: The payment trust application reads from the personalization data Perso the access data "keys" in the form of a signature generation key, signs the transaction data T, thereby generates a signature and combines the transaction data T and the signature to form a transaction instruction Signed(T). 2.4: The payment trust application TA sends the transaction instruction Signed(T) via a TEE-internal socket API (special supplementary API) to the payment service provider PSP, which verifies the signature of the transaction instruction Signed(T) with the matching signature verification key and, in the positive case, initiates the clearing and, 2.5, sends a "receipt" R back to the TEE socket API; still 2.5: the TEE socket API sends the receipt Ron to the payment trust application TA. 3: The payment trust application TA sends the receipt R via the secure NFC driver NFC to the payment terminal PT which, 3.1, forwards the receipt R to the merchant server M for information.

Figure 8:
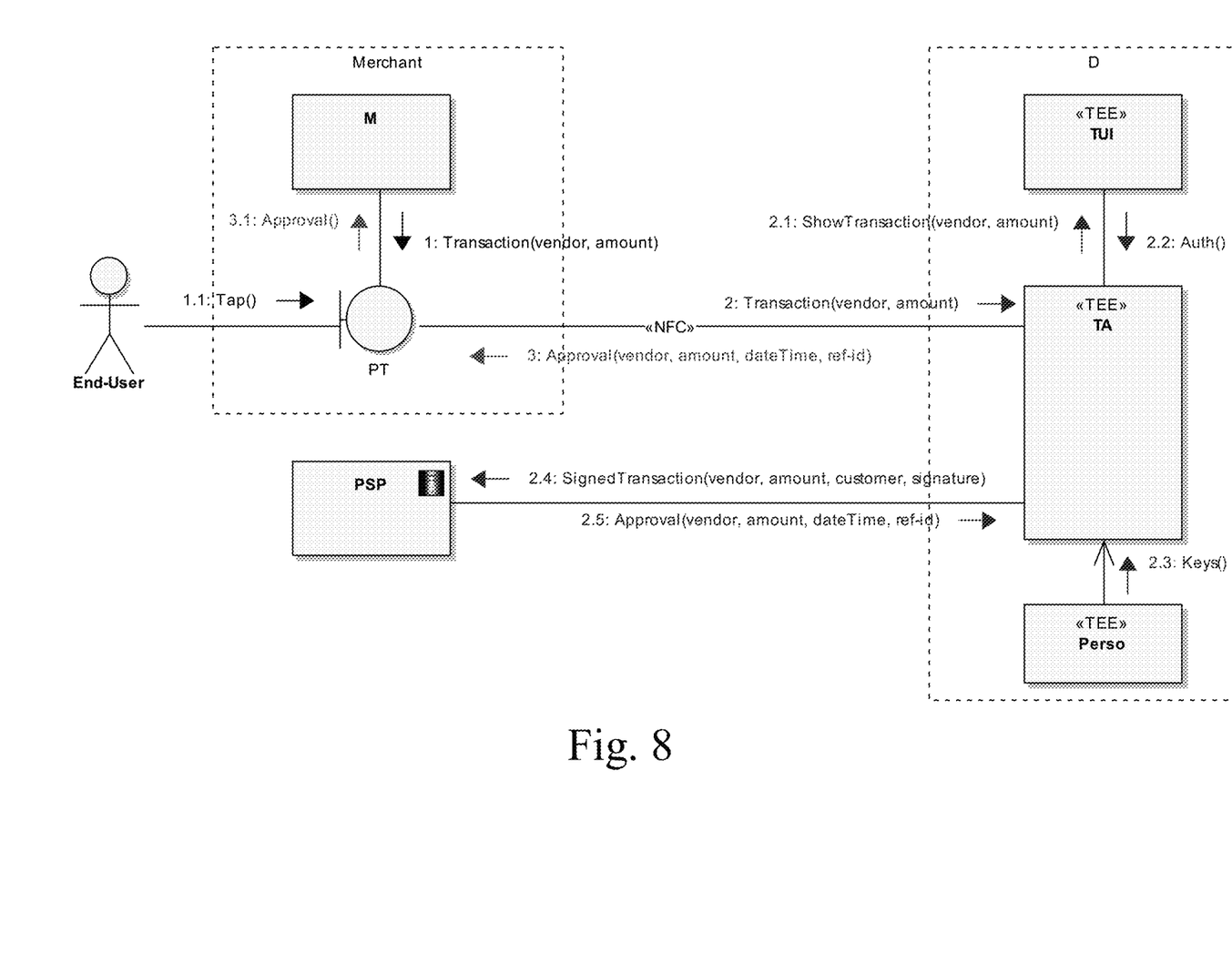
FIG. 8 a flowchart for a transaction in a system according to FIG. 7.

FIG. 8 again illustrates a transaction procedure in an overview, and the variable stock of transaction data involved therein. 1: The merchant server M transmits transaction data T (at least merchant, amount) to the payment terminal PT which invites the customer to approach the terminal D. 1.1: The customer holds the terminal D to the payment terminal PT within the NFC range. 2: The payment terminal PT sends the transaction data T to the terminal D, directly into the secure runtime environment TEE. 2.1: The payment trust application TA sends the transaction data T to a secure input/output interface, namely a secure world GUI (graphical user interface), called trusted user interface TUI, of the terminal D, for example a secure (touch) display whose driver is implemented in the TEE; said display displays the transaction data (at least merchant, amount) to the customer; the customer authenticates himself vis-à-vis the terminal, thus confirming the transaction data. 2.2: The transaction confirmation input by the customer, possibly by inputting a PIN, password, fingerprint, etc., is accepted in the secure runtime environment TEE. 2.3: The payment trust application TA complements the transaction data by a date and time stamp dateTime, signs the complemented transaction data T to form a signature, generates from the signature and the plain-text transaction data T the transaction instruction SignedTransaction( )=Signed(T) and, 2.4, sends the transaction instruction Signed(T) to the payment service provider PSP. The payment service provider PSP verifies the transaction data T by means of the signature, adds a reference ID to the transaction data T, and, 2.5, in the positive case of a positive signature verification, sends an approval A (i.e. a confirmation) back to the payment trust application TA (T now including merchant, amount, date, time, reference ID). 3: The payment trust application TA sends the approval A to the payment terminal PT, which, 3.1, forwards it to the merchant server M for information.

FIG. 9 shows a system for mobile payment in a structural representation according to a fourth embodiment of the invention, wherein the agent is integrated in the payment trust application TA in the secure runtime environment TEE, like in FIG. 7. Unlike the third embodiment of FIG. 7, the fourth embodiment according to FIG. 9 does not use an option to transmit a signed transaction instruction Signed(T)

directly to the payment service provider PSP. Accordingly, the TEE Socket API of FIG. 7 is missing. Instead, in steps 2.4+3, the transaction instruction Signed(T) is sent to the payment service provider PSP via the secure NFC interface NFC of the terminal D implemented under the control of the security operating system TEE-OS and via the payment terminal PT. The steps 1 to 2.3 are effected like in FIG. 7. 2.1: The transaction data are displayed to the customer on the secure user interface TUI. 2.2: The customer authenticates himself by means of authenticators (e.g. PIN input etc. via TUI) offered and accepted by the terminal D. 2.3: Following authentication and confirmation, the TA computes the signature over the transaction data T by means of the signature generation key stored in the secure area (key was introduced upon personalization, for example). 2.4: The confirmed and signed transaction Signed(T) is transferred via the NFC interface to the payment terminal PT. 3: From there, the signed and confirmed transaction Signed(T) is forwarded to the payment service provider PSP without processing in the payment terminal PT itself 3.1: The payment service provider PSP checks the signature and, if successful, sends a receipt R to the payment terminal PT, whereby the payment transaction is concluded. 3.2: For information the payment terminal PT sends the receipt also to the merchant server M.

Figure 10:
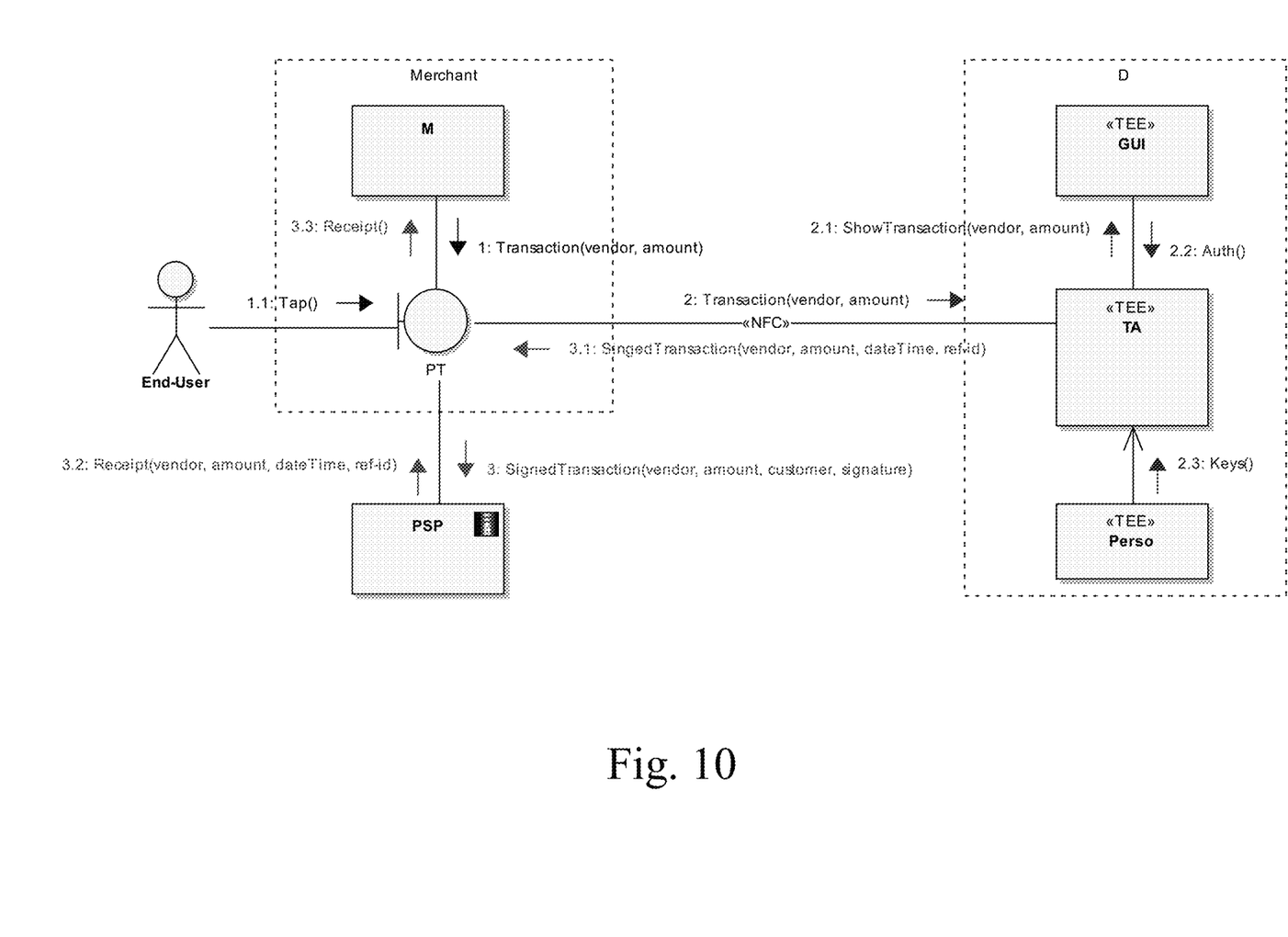
FIG. 10 a flowchart for a transaction in a system according to FIG. 9.
Figure 11:
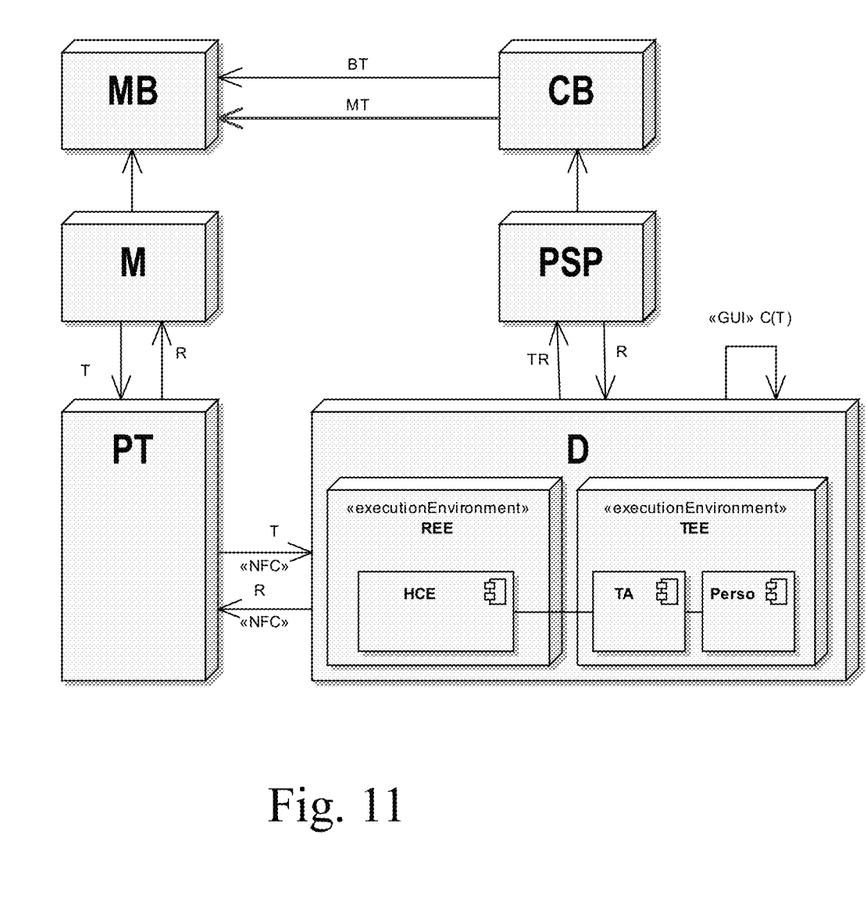
FIG. 11 shows a flowchart of a mobile terminal according to embodiments herein.

FIG. 10 shows a flowchart in which communication flows and the varying stock of transaction data T (merchant "vendor", sum "amount", date and time stamp "dateTime", reference ID "ref-ID") are represented in the course of a payment in the system of FIG. 9.

The invention claimed is:

1. A mobile terminal of a customer, adapted for mobile payment through a payment in accordance with transaction data from the customer to a merchant via a payment service provider, which is adapted to initiate a clearing of the payment between bank servers of the customer and the merchant, wherein the mobile terminal comprises:
a normal runtime environment and a secure runtime environment;
an agent which is adapted to accept transaction data from a payment terminal;
an authorization interface implemented in the terminal, which is adapted to present transaction data accepted at the agent to the customer for authorization and to accept and forward an authorization input by the customer at the authorization interface;
a payment application implemented in the terminal, at least one secure portion of which, including a payment trust application, is implemented in the secure runtime environment and which is adapted to accept an authorization forwarded by the authorization interface and, in response to the accepted authorization, to generate and send a transaction instruction;
wherein
a) in the secure runtime environment access data are stored for an authentication between the payment trust application and the payment service provider; and
b) the agent is further adapted to:
b1) upon an authentication between the payment trust application and the payment service provider: to transmit access data or authentication data generated employing access data between the secure runtime environment and the payment service provider; and
b2) to accept from the payment trust application a transaction instruction for a payment in accordance with the transaction data and send to the payment service provider via a secure channel, bypassing interruption of the secure channel at the payment terminal such that no interruption of the secure channel occurs at the payment terminal.

2. The terminal according to claim 1, wherein the agent is configured as a software emulation of a smart card, including an Android host-based card emulation HCE.

3. The terminal according to claim 1, wherein the agent is configured as a trust application implemented in the secure runtime environment or integrated in such a trust application.

4. The terminal according to claim 1, wherein the agent is configured as a payment trust application or integrated in the payment trust application.

5. The terminal according to claim 1, wherein the access data include a channel key for setting up and operating the secure channel between the secure runtime environment and the payment service provider and the agent is adapted
according to b1) to set up the secure channel employing the channel key and
according to b2) to send the transaction instruction via the secure channel to the payment service provider.

6. The terminal according to claim 1, wherein the access data include a signature generation key for generating a signature, wherein the transaction instruction can be generated by signing the transaction data by means of the signature generation key, wherein the corresponding signature verification key is stored at the payment service provider, and the agent is adapted
according to b1) and b2) to send a transaction instruction generated by signing the transaction data with the signature generation key to the payment service provider, so that the transaction data are verifiable for the payment service provider.

7. A mobile payment method for a terminal of a customer, adapted for mobile payment through payment in accordance with transaction data from the customer to a merchant via a payment service provider, which is adapted to initiate a clearing of the payment between bank servers of the customer and the merchant,
wherein the mobile terminal includes:
a normal runtime environment and a secure runtime environment;
an agent implemented in the terminal; an authorization interface implemented in the terminal;
and a payment application implemented in the terminal, at least one secure portion of which, including a payment trust application, is implemented in the secure runtime environment;
wherein in the method:
by the agent: transaction data are accepted from a payment terminal;
by the authorization interface: transaction data received at the agent are presented to the customer for authorization and an authorization input by the customer at the authorization interface is accepted and forwarded;
by the payment trust application: an authorization forwarded by the authorization interface is accepted and, in response to the accepted authorization, a transaction instruction is generated and sent;
wherein
a) between the payment trust application and the payment service provider an authentication is carried out employing the access data stored in the secure runtime environment; and b) by the agent:
- b1) upon authentication between the payment trust application and the payment service provider access data or authentication data generated employing access data are transmitted between the secure runtime environment and the payment service provider; and
- b2) the transaction instruction sent by the payment trust application is accepted and sent to the payment service provider via a secure channel, bypassing interruption of the secure channel at the payment terminal such that no interruption of the secure channel occurs at the payment terminal.

8. The payment method according to claim 7, wherein the access data include at least one channel key for setting up and operating the secure channel between the payment trust application and the payment service provider, and wherein the agent
- in step b1) establishes the secure channel employing the channel key and
- in step b2) sends the transaction instruction via the secure channel to the payment service provider.

9. The payment method according to claim 8, wherein the agent in step b1) establishes the secure channel directly to the payment service provider.

10. The payment method according to claim 8, wherein the agent establishes the secure channel to the payment service provider via an NFC payment terminal which does not have the access data, and merely passes on the transaction instruction.

11. The payment method according to claim 7, wherein the access data include a signature generation key for generating a signature for the verification of the transaction data, wherein the corresponding signature verification key is stored at the payment service provider, and wherein the transaction instruction is generated by the payment trust application, wherein the transaction data are signed with the signature generation key;
- and wherein the agent, according to b1) and b2), sends the generated transaction instruction to the payment service provider, so that the transaction data are verifiable for the payment service provider with the signature verification key.

* * * * *